Patented Sept. 13, 1938

2,130,249

UNITED STATES PATENT OFFICE 2,130,249

METHOD OF FILTERING SEWAGE AND THE LIKE

William Raisch, Forest Hills, N. Y., assignor to Municipal Sanitary Service Corporation, New York, N. Y., a corporation of New York No Drawing. Application October 6, 1933, Serial No. 692,435

12 Claims. (Cl. 210—62)

The present invention relates to filtration and has for its principal object a considerable increase in capacity of filtration without substantial decrease in quality of filtration.

Heretofore it has been proposed, particularly in connection with the filtration of solid-bearing liquid such as sewage, to utilize paper or cellulose pulp and the like in order to assure the formation of an effective filter mat or cake, the cake being removed, repulped, returned to the sewage stream before the latter reaches the filter, and reused until exhausted. The exhausted pulp was disposed of in any suitable manner. In developing the present invention, the exhausted pulp was treated, as by washing and screening, to remove the impurities or sewage solids and also the finer fibres of the pulp, which fibres may be described as powder-like. When the treated pulp was again used for filtration, it was found that, although the capacity for filtration was greatly increased, there was no material reduction, if any, in the quality of the filtration. This condition would also exist with respect to fresh pulp, from which would be removed all powder-like non-fibre-like solids and powder-like fibres which are too short for matting together without the presence of longer fibres. In the repeated repulping and passing of the pulp material through the apparatus used in carrying out the method, the fibres may be broken down to some extent. The small fibres thus formed will, however, be removed by the next pulp treating operation, and, if found desirable, the deficiency in the amount of pulp may be made up by the addition of fresh pulp.

Although the pulp used in carrying out the method of the present invention may be prepared from any suitable material, such as paper or cellulose, it is preferably prepared from waste material. This tends to economy in operation by avoiding expenditure for mat forming material and by using to advantage waste paper which would otherwise have to be disposed of in a manner which would involve some expense.

In carrying out the method in a preferred manner, a suitable amount of the paper is shredded and then mixed in a tank with make-up water to bring the pulp to the proper consistency. The pulp is then, after the removal of powder-like fibres and fine impurities, transferred as by pumping to repulping troughs or tanks where it is mixed with sewage of a sewage stream and then is preferably passed into the tanks of vacuum filters. The connection with the make-up tank is then closed and the filtering action begun. Each of the vacuum filters is preferably of the rotary type including a rotary drum on which is formed a cake of sewage solids and paper pulp as the filtrate is drawing through and out of the drum. After cake has been withdrawn from the liquid in the filter tank, it is stripped from the drum and returned to the repulping trough for repulping and return to the filter tank, the vacuum being preferably low to leave the cake in condition for easy repulping. This is repeated until the accumulation of sewage solids is substantially sufficient to clog the cake and prevent efficient operation for example in regard to capacity. The cake is then removed from the filter drum without passing it to the repulping trough.

Heretofore the exhausted pulp thus produced was considered useless for further filtration and was disposed of in any suitable manner. According to the present invention this exhausted pulp is washed and screened, whereby not only the sewage solids but also the finer fibres are removed, thus producing pulp that if used in carrying out filtration of this kind will produce effective filtration while permitting a large volume of filtrate to pass therethrough. The capacity for filtration will thus be increased greatly.

It will be evident that the present invention enables the filtrate to be withdrawn at a more rapid rate than before without any falling off in quality of filtration, and in fact provides a very satisfactory way for controlling the filtration. Preferably the small fibres to be removed are such as will pass through a 40-60 mesh that is 40 to the inch in one direction and 60 to the inch in the direction at right angles thereto, but the kind of mesh may be varied somewhat to meet changes in conditions. Advantageous results may also be obtained with coarser screens down to 30-30 mesh and with finer screens up to 60-60 mesh. Outside of these limits, the results are not so satisfactory and it is desirable to keep well within these limits—40-40 and 40-60 meshes having been used considerably and found to give very satisfactory results.

It should be understood that changes in different details may be made and that various features may be used without others without departing from the true scope and spirit of the invention.

Having thus described my invention, I claim:

1. The method of filtering sewage containing solids, which includes the treatment of fibrous paper pulp by washing to remove fibres which can be washed through screens of from 40-40 to 40–60 mesh, the addition of the treated paper pulp to a sewage stream to assure the formation of an effective filter mat on a filter, the passage of the mixture thus formed to the filter, and the reuse of the paper pulp until exhaustion by repeated removal, repulping and return of the cake to the sewage stream before it reaches the filter.

2. The method of filtering sewage containing solids, including the use of cellulose pulp to exhaustion by the addition of the cellulose pulp to a sewage stream to assure the formation of an effective filter mat on a filter, the passage of the mixture thus formed to the filter, and the reuse to exhaustion of the cellulose pulp by repeated removal, repulping and return of the cake to the sewage stream before it reaches the filter; treatment of the exhausted cellulose pulp to remove the sewage solids and the cellulose fibres which may be washed through a screen of substantially 40–60 mesh; the reuse of the treated cellulose pulp in such filtration; and the addition of fresh cellulose pulp as required to replace cellulose fibres lost as in the treating operation.

3. The method of filtering sewage containing solids, which includes the addition of cellulose pulp to a sewage stream to assure the formation of an effective filter mat on a filter, the passage of the mixture thus formed to the filter, the reuse of the cellulose pulp to exhaustion by repeated removal, repulping and return of the cake to the sewage stream before it reaches the filter, and the control of capacity of filtration by limitation of minimum size of cellulose fibres to those which will be retained in washing shorter fibres through substantially a 40–60 mesh.

4. The method of filtering sewage containing solids which includes the treatment of fibrous paper pulp by washing to remove fibre which can be washed through a screen of no finer mesh than 60–60 mesh and of no coarsesr mesh than 30–30.

5. The method of filtering sewage containing solids, which includes the treatment of fibrous paper pulp by washing to remove fibres that can be washed through screens of from 60–60 to 30–30 mesh, the addition of the paper pulp thus treated to a sewage stream to assure the formation of an effective filter mat on a filter, the passage of the mixture thus formed to the filter, and the use of the paper pulp for filter cake purposes by the repeated formation of a filter cake, its removal from the filter, and the repulping of the cake with the sewage stream before it reaches the filter.

6. The method of filtering sewage containing solids, including the use of cellulose pulp to exhaustion by the addition of the cellulose pulp to a sewage stream to assure the formation of an effective filter mat on a filter, the passage of the mixture thus formed to the filter, and the reuse to exhaustion of the cellulose pulp by repeated removal, repulping and return of the cake to the sewage stream before it reaches the filter; treatment of the exhausted cellulose pulp to remove the sewage solids and the cellulose fibres that may be washed through a screen of from 60–60 to 30–30 mesh; the reuse of the treated cellulose pulp in such filtration; and the addition of fresh cellulose pulp as required to replace cellulose fibres lost in the treating operation.

7. The method of filtering sewage containing solids, which includes the addition of cellulose pulp to a sewage stream to assure the formation of an effective filter mat on a filter, the passage of the mixture thus formed to the filter, the reuse of the cellulose pulp to exhaustion by repeated removal, repulping and return of the cake to the sewage stream before it reaches the filter and the control of capacity of filtration by limitation of minimum size of cellulose fibres to those that will be retained in washing shorter fibres through substantially a 60–60 mesh.

8. The method of filtering sewage containing solids, which includes the addition to a sewage stream on its way to a filter of cellulose pulp to assure an effective mat on the filter; the repeated formation of cake containing such cellulose pulp, the removal and the return of the cake to the filter of pulp in the cake in repulped condition in said stream; and the control of the filtration for uniformity by removing from said pulp fibres that can be washed through substantially a 60–60 mesh.

9. The method of separating the solids from a solid-bearing liquid which comprises producing a paper pulp from waste paper, removing from the pulp substantially all the powder-like non-fibre-like solids and powder-like fibres which are too short for matting together without the presence of longer fibres, adding the pulp freed of said short fibres and non-fibre-like solids to the solid-bearing liquid, and filtering the solid-bearing liquid to which the pulp has been added.

10. The method of separating the solids from a solid-bearing liquid which comprises producing a paper pulp from waste paper, removing from the pulp substantially all non-fibre-like solids and fibres which may be washed through a screen of 60–60 mesh, adding the pulp freed of said short fibres and non-fibre-like solids to the solid-bearing liquid, and filtering the solid-bearing liquid to which the pulp has been added.

11. The method of separating the solids from a solid-bearing liquid, which comprises, adding paper pulp to the solid-bearing liquid, filtering the solid-bearing liquid to which the pulp has been added and thereby producing a cake comprising the paper pulp and solids separated from said solid-bearing liquid, separating from cake thus formed fibres rendered too short by the filtering action, for matting together and also solids separated from said solid-bearing liquid whereby clean fibre of matting length will be left, and adding the clean fibre thus produced to the solid-bearing liquid for reuse in filtering.

12. The method of separating the solids from a solid-bearing liquid which comprises producing cellulose pulp, removing from the pulp substantially all non-fibre-like solids and fibres which are too short for matting purposes, adding the clean pulp freed of such short fibres and non-fibre-like solids to the solid-bearing liquid, filtering the solid-bearing liquid to which the pulp has been added by passing it through a cake formed of the cleaned pulp and solids taken from said solid-bearing liquid, separating from cake thus formed fibres rendered too short by the filtering action, for matting together and also solids separated from said solid-bearing liquid, whereby clean fibre of matting length will be left, and adding the clean fibre thus produced to the solid-bearing liquid for reuse in separating solids.

WILLIAM RAISCH.